(12) United States Patent
Stottlemyer et al.

(10) Patent No.: US 7,209,408 B1
(45) Date of Patent: Apr. 24, 2007

(54) DISTRIBUTED, SOFT-BODIED, TOWABLE, ACTIVE ACOUSTIC SYSTEM

(75) Inventors: Thomas R. Stottlemyer, Mystic, CT (US); Tracey Acquaro-Paes, Exeter, RI (US); Michael P. Rousseau, Portsmouth, RI (US)

(73) Assignee: United States of America represented by the Secretary of the Navy, Washington, DC (US)

( * ) Notice: Subject to any disclaimer, the term of this patent is extended or adjusted under 35 U.S.C. 154(b) by 214 days.

(21) Appl. No.: 10/963,003

(22) Filed: Oct. 7, 2004

(51) Int. Cl.
*H04R 1/00* (2006.01)
(52) U.S. Cl. ..................................................... 367/154
(58) Field of Classification Search ................ 367/106, 367/130, 153, 154, 3
See application file for complete search history.

(56) References Cited

U.S. PATENT DOCUMENTS 4,509,151 A * 4/1985 Anderson ................... 367/130
6,088,296 A * 7/2000 Seaman et al. ............. 367/106
6,088,297 A    7/2000 Stottlemyer

* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

A towed active acoustic system includes a plurality of soft-bodied, towable, active acoustic modules. The plurality of active acoustic modules are suspended at various depths within the water column, and allow each active acoustic module to be much smaller than known soft-bodied systems and to operate at a much lower source level while still ensuring that the entire water column is ensonified. Each active acoustic module may include different numbers of transducers depending on the intended location of the active acoustic module relative to the water column. The tow cable preferably includes a faired body designed to minimize hydrodynamic drag and turbulence. The present system can be deployed and recovered through shipboard undersurface deployment tubes.

11 Claims, 5 Drawing Sheets

DISTRIBUTED, SOFT-BODIED, TOWABLE, ACTIVE ACOUSTIC SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to the field of sonar sensors and in particular to towed, active sonar arrays.

(2) Description of the Prior Art

Although passive (receiving) towable sonar arrays have become refined technology, active (transmitting) arrays, because of the requirement that the active array be positioned in a vertical position, to achieve vertical aperature have presented certain drawbacks. Typical conventional active systems are mounted in hard, typically large, rigid towed bodies, for example, the current AN/SQS-35 tow body. The tow body is required to maintain the active array in a proper vertical orientation in order to provide the required acoustic pattern.

Conventional towed active sonar systems are large, cumbersome, and require expensive handling systems that use a substantial amount of space aboard a surface combatant. Depending on the frequency of the transducers, the hard, towed bodies are quite large and difficult to handle, frequently weighing up to 4000 pounds or more. Additionally, the handling equipment needed to deploy and recover such a tow body requires considerable deck space on the aft end of the ship and this equipment can increase the radar cross-section of the ship.

These types of handling systems impose limitations on the maneuverability of the tow vessel, prevent the covert deployment of the active array, and are unwieldly and dangerous for deployments or recoveries during high sea states.

In an attempt to solve many of the problems discussed above, soft-bodied towable devices have been developed. These soft-bodied devices 60, FIG. 1, along with a towed receiver array 62, are attached to the vessel 100 via the towing cable 64, as described in U.S. Pat. No. 6,088,293, which is incorporated by reference as if fully set forth herein. However, known soft-bodied devices 60 suffer from several problems.

A disadvantage of these known devices is that the single soft-bodied device 60 transmits at only one depth D within a water column, and as a result, in only a single water layer 70. The depth of the water layer 70, 72 depends on numerous factors including, but not limited to, overall water depth, salinity, environmental characteristics, and water currents. The boundary of the layer tends to reflect the acoustic signals 74, create "shadow zones" or areas where submarines and the like can hide without being detected, and reduce the performance of the sonar system.

Accordingly, what is needed is an active transducer array that can be deployed from a ship in a manner similar to the deployment of passive transducer arrays, such as paying out through a hull-mounted port. The active transducer array should also be capable of simultaneously operating at various depths such that the system may ensonify the entire water column to optimize the distribution of acoustic energy for the particular environment, including the various water layers 70, 72. Moreover, the tow cable should minimize the hydrodynamic drag forces.

SUMMARY OF THE INVENTION

Accordingly, it is an object of the present invention to provide an active sonar transducer array, which can be deployed and recovered using conventional cable-handling systems.

It is another object of the present invention to provide an active sonar transducer array capable of simultaneously operating at various depths such that the system may ensonify the entire water column.

It is yet another object of the present invention to provide a system which minimizes the hydrodynamic forces created by both the active sonar transducer array as well as the tow cable.

The present invention features a towed active acoustic system including a tow cable and a plurality of soft-bodied, towable, active acoustic modules. The soft-bodied, towable, active acoustic modules are disposed between the segments of the tow cable such that each soft-bodied acoustic module is disposed at a different depth in a water column. Each soft-bodied acoustic module includes a suspension fixture for attachment to one of the tow cable segments and a flexible body portion which houses an active acoustic array and allows lateral bending of the body portion. The active acoustic array is located within the body portion and extends along a span of the body portion. The pivotable attachment allows the body portion (including the active acoustic array) to be towed in a substantially vertical position.

The tow cable preferably includes a non-rigid, fairing cross-section. The active acoustic array preferably comprises a plurality of acoustic transducers connected together with flexible connectors. In the exemplary embodiment, each of the soft-bodied acoustic modules includes a different number of acoustic transducers.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
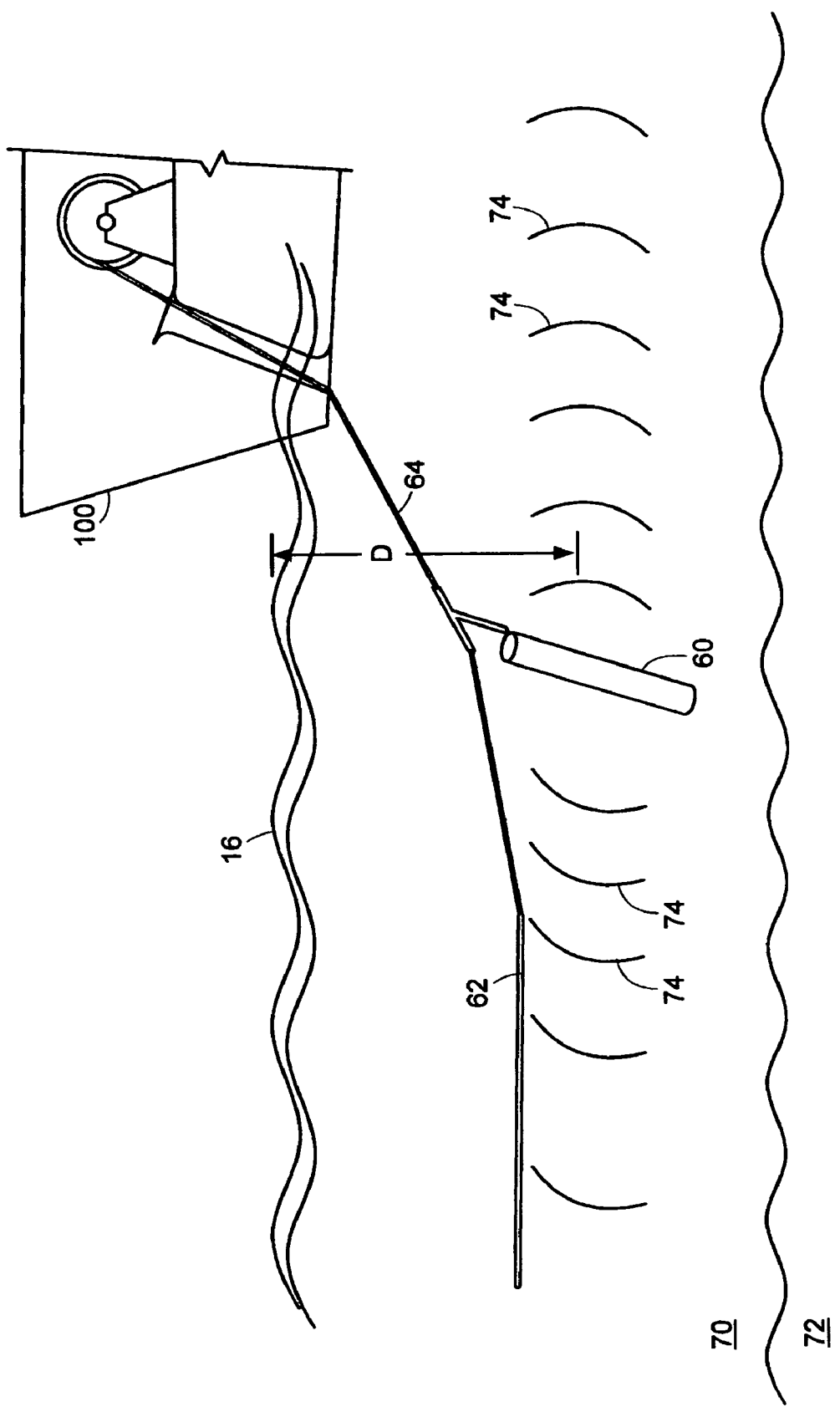
FIG. 1 is a schematic side view of a prior art soft-bodied active acoustic module showing the deployment of the soft body, active acoustic module as attached to a deployed passive receiver array.
Figure 2:
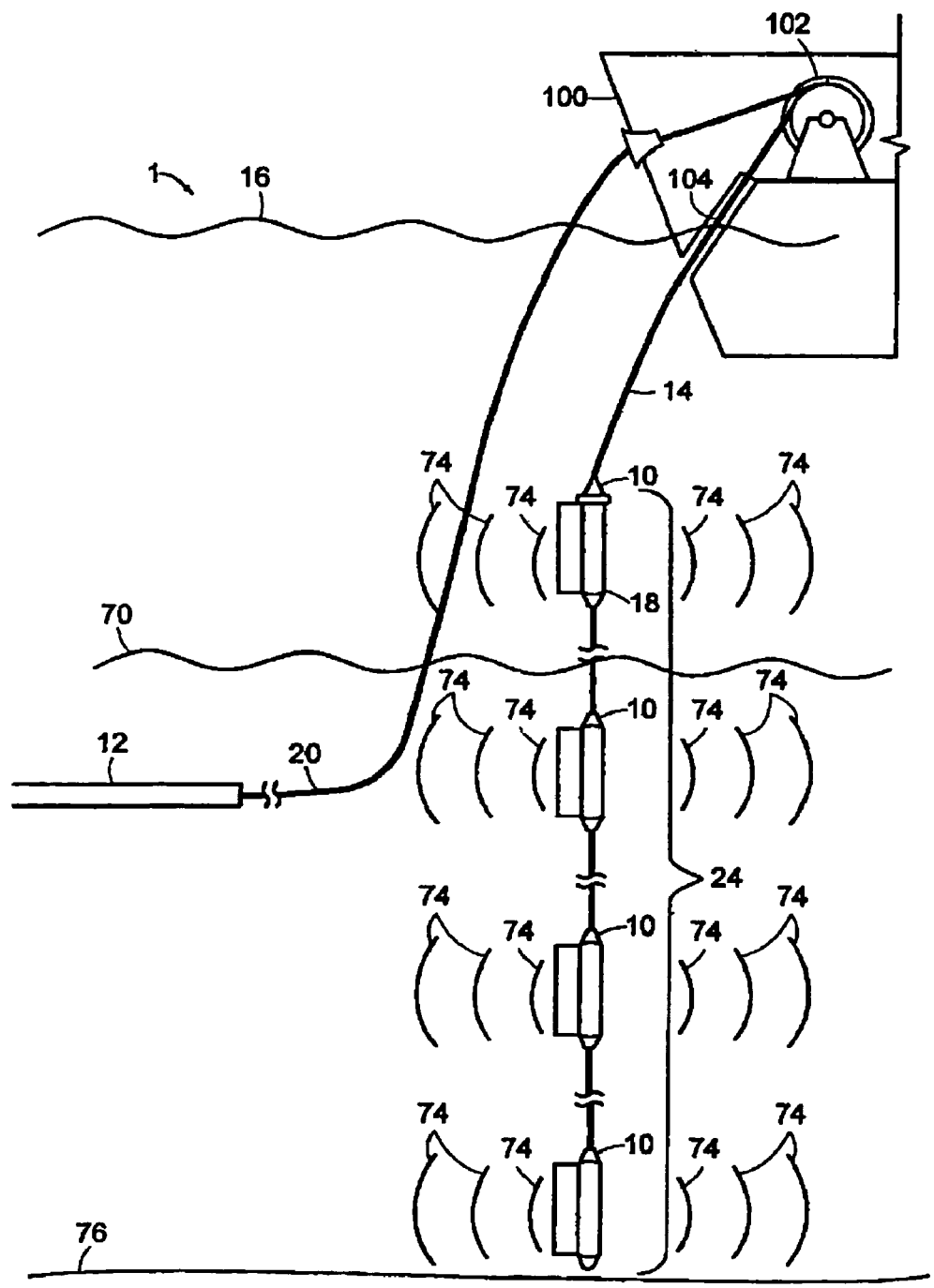
FIG. 2 is a schematic side view of the towed active acoustic system of the present invention having four soft-bodied active acoustic modules and passive receiver arrays.

The towed active acoustic system 1, FIG. 2, includes two or more active acoustic modules 10 each having a soft-bodied active acoustic module 10 working in conjunction with a passive acoustic array 12. While four soft-bodied active acoustic modules 10 are shown, the number could be higher or lower, depending on the particular characteristics of area to be scanned. The use of multiple active acoustic modules 10 allows the system 1 to ensonify the entire water column, thus increasing the system's 1 overall performance and reducing the number of "shadow zones" or areas where submarines and the like can hide without being detected by the acoustic transmissions 74.

Because of the flexible structure and the relatively small physical size (compared to current hard-bodied and soft-bodied designs), the active acoustic modules 10 are deployable from the ship 100 using the available recovery system 102. The recovery system 102 is preferably a below-decks system using an underwater deployment tube 104 that deploys the sonar arrays beneath the sea surface 16. The active acoustic modules 10 are shown deployed with a strengthened towline 14 comprising a signal pathway wrapped with a steel tow cable section. The sections of towline 14 are preferably faired with a non-rigid fairing that is intended to reduce the hydrodynamic drag on the towline 14, allowing the towed active acoustic system 1 to tow more vertically. The non-rigid fairing also has the advantage that it can be reeled in onto the winch 102 in multiple cable layers, without increasing the diameter of the cable significantly.

The active acoustic module 10 comprises the suspension fixture soft body enclosure 18. The soft body enclosure 18 has a rounded leading edge 18A and a fairing 18B, preferably forming a hydrofoil with a span extending downward. See FIG. 4. A typical passive receiver array 12 is depicted using a second towline 20. Second towline 20 is preferably made from an aramid fiber material such as Kevlar wrapped around a passive signal pathway. The entire array system 1, both the passive 12 and active modules 10, can be deployed using a single deployment/recovery system 102. Additionally, the system 1 can be recovered through the underwater deployment tube 104, thereby eliminating the current deck side systems and reducing the radar signature of the ship 100.

Figure 3:
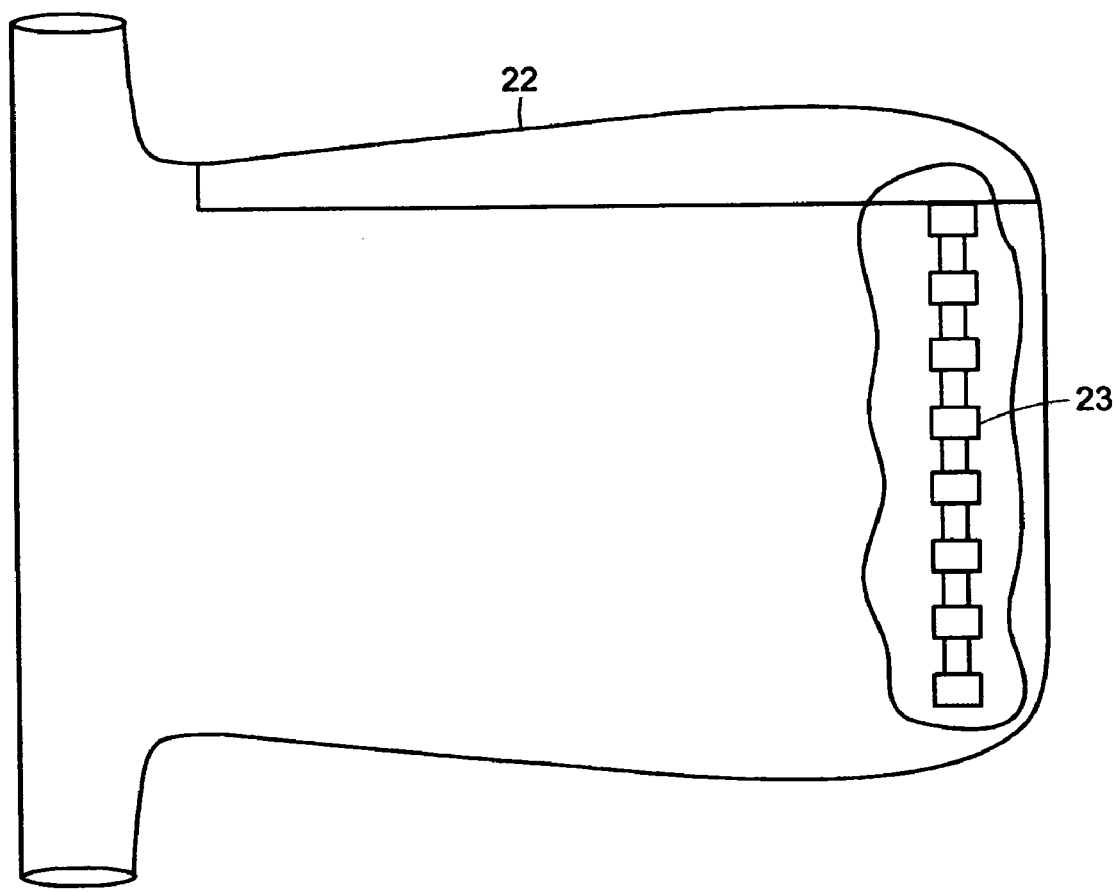
FIG. 3 is a side view of a prior art active acoustic module showing a conventional hard-body design.

By comparison, current prior art implementation of active sonar modules requires hard tow-bodies as depicted in FIG. 3. The hard tow-body 22 is large and cumbersome because the vertical dimension must be large enough to allow the active acoustic array 23 to fit within the tow body. This type of large tow body creates significant hydrodynamic effects including wake, drag and increased acoustic signature.

Figure 4:
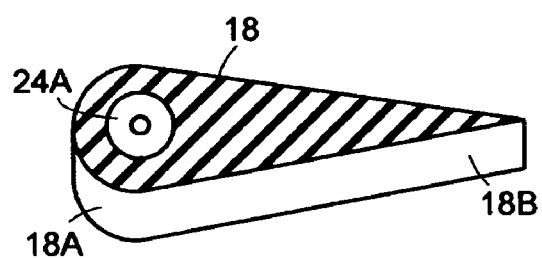
FIG. 4 is a top view of the soft body module showing the faired shape of the soft body.
Figure 5:
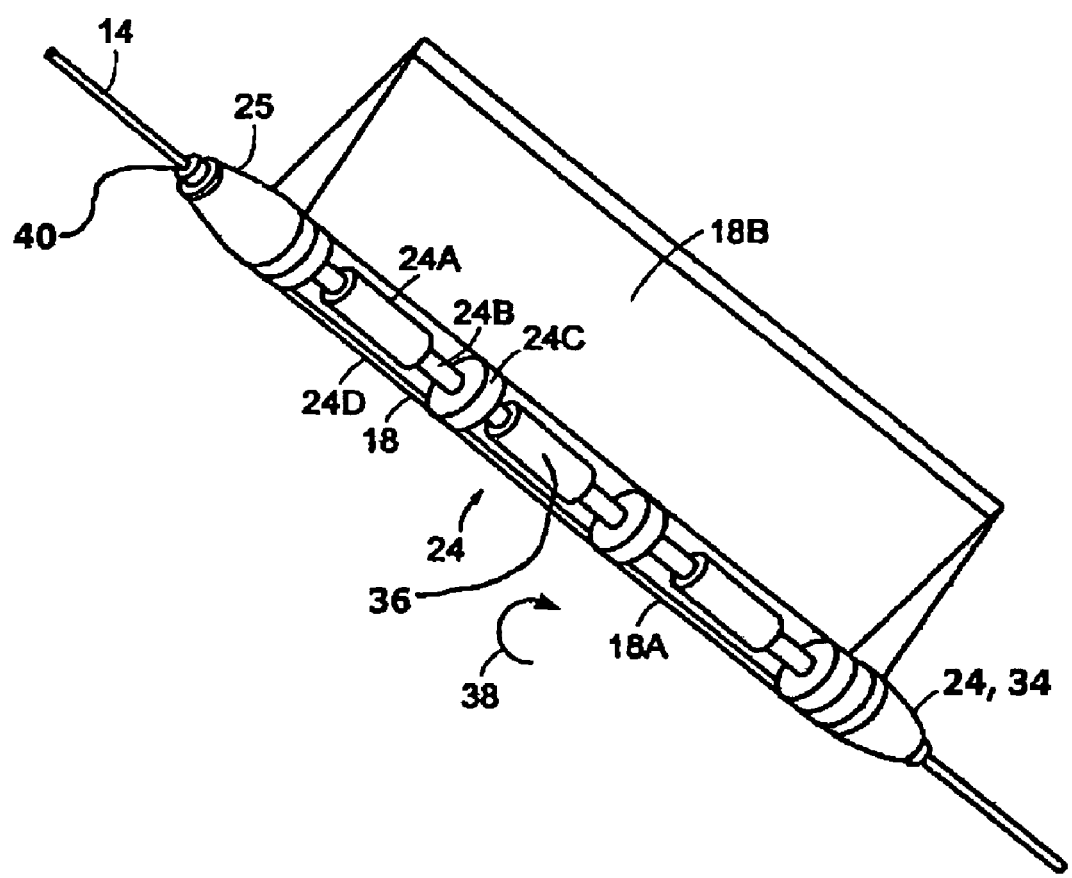
FIG. 5 is a cross-sectional side view of the soft body module showing the major components of the invention.

In contrast, as shown in FIGS. 4 and 5, the structure of the present invention is only slightly larger than an acoustic array. FIG. 4 is a top view of the soft body enclosure 18 which encloses the active acoustic array 24. Because each module termination 25 can rotate or swivel, the hydrofoil 18 aligns with water flow reducing drag (FIG. 2) over the normal operating speed range. The lower end of the hydrofoil 18, however, may develop lateral oscillations at certain speeds due to small changes in yaw angle. The location of the weight 34 (FIG. 5) aids in dampening any oscillations. The active acoustic array 24 is shown to depict the relatively small size of the hydrofoil faired-body 18 compared to the overall size of the active acoustic array 24. This compact and faired body produces minimal hydrodynamic effects behind a towing ship 100. The acoustic array 24 is made up of a plurality of transducers 24A which are joined together by elastomeric material and cabling 24B. Spacers 24C made from elastomeric material are also positioned in the module to hold the transducers 24A and cabling 24B in a preset position. Spacers 24C can serve to retain other environmental sensors in position in the module. A fairing 24D is provided for the modules.

Moreover, each active acoustic module 10 may be much smaller than known soft-bodied systems and transmit at a much lower source level because there are a number of them at various depths D in the water column. The active acoustic modules 10 may also be designed with different numbers of transducers 24 in each of them, depending on location. For example, it may be more desirable to have more transducers 24 in the active acoustic module 10 furthest from the ship 100, since the angle at which sound 74 hits the bottom 76 from this location is very shallow and will travel long distances. It may also be desirable to optimize the number of transducers 24 in the upper source, closest to the ship 100, for operation in the surface duct (i.e., above the thermal layer 70).

The system 1 also has the advantage that it can be reconfigured aboard the ship 100. If the ship 100 is going into a different operational environment (e.g., shallow water), it may be desirable to reduce the number of active acoustic modules 10 along the cable 14, or place active acoustic modules 10 with fewer transducers 24 on the cable 14.

In addition to stability, the faired body 18 must maintain the substantially vertical orientation of the active acoustic array 24. This feature may be seen in FIG. 6 wherein the active acoustic module 10 is shown suspended from the tow cable 14 during typical towing conditions. The offset balancing weight 34 (shown in FIG. 5) attached in a lower and rearward location on the faired body 18, and therefore the offset location of the center-of-gravity 36, results in a counter-clockwise torque 38 caused by the center-of-gravity 36 aligning itself vertically under the suspension point 40 (corresponding with tow point 32 in FIG. 6) on suspension fixture 42. Referring to the FIG. 6, the resulting position of the hydrofoil with no motion (and no drag) through the water is shown by the dash-lined position 44. As the tow speed is increased, the hydrodynamic drag on the foil provides a rearward counter clockwise torque 46 thereby moving the hydrofoil 18 to position 48 where the torques of the weight offset and the water drag are balanced. This action maintains the active array within a substantially vertical position over the operational speed of the tow vessel, that is, within 30 degrees of a vertical alignment.

Figure 6:
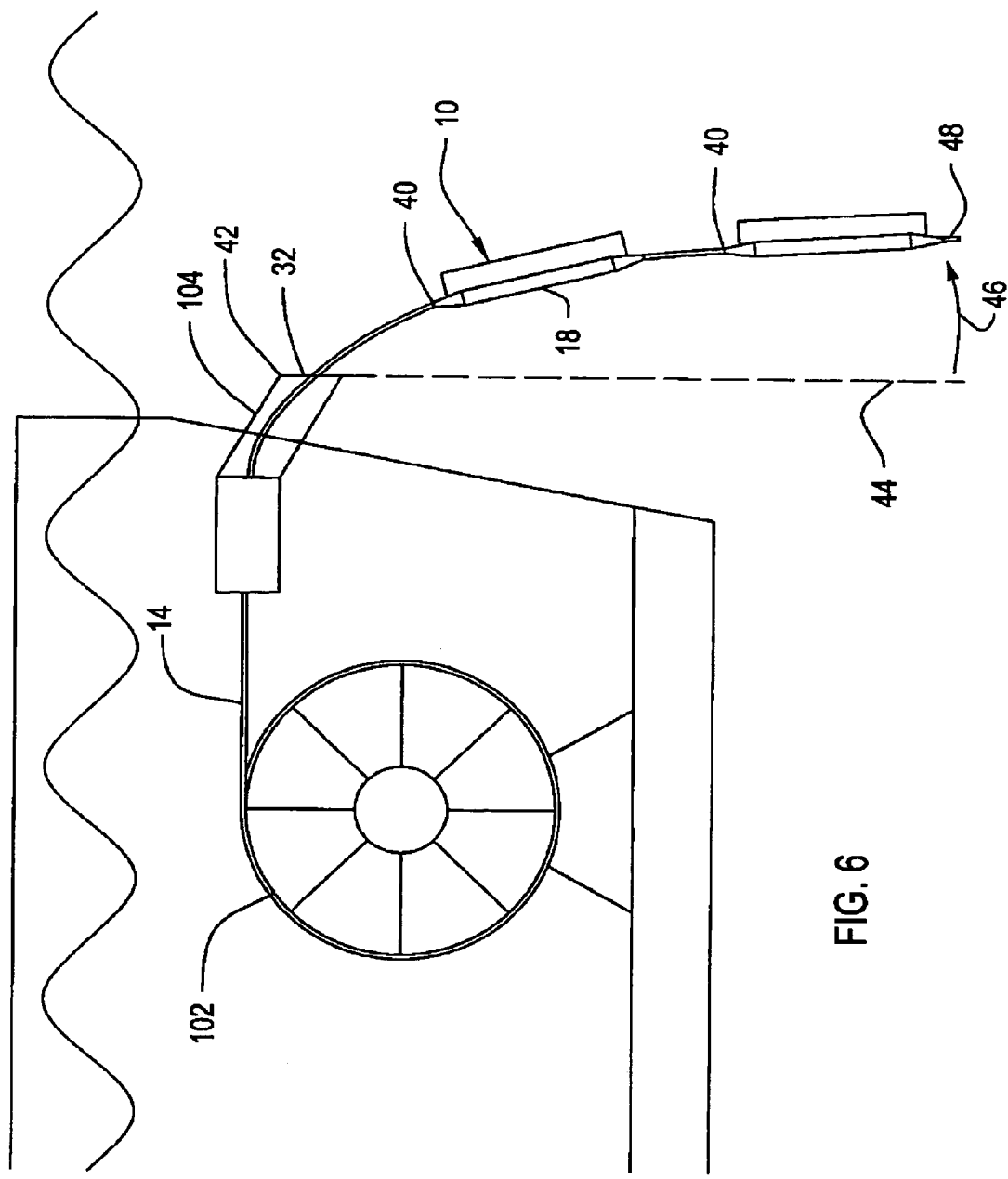
FIG. 6 is a schematic side view showing the recovery of the soft body module.

Referring to FIG. 6, the active acoustic module 10 is shown during recovery through a deployment tube 104 of a ship 100. As the module 18 enters the tube 104, module 18 pivots up into the tube 104. Because the hydrofoil 18 is free to pivot around suspension point 40, the hydrofoil 18 aligns in the tube. Finally, the segmented section and flexible construction of the hydrofoil 18 allow the foil 18 to turn sideways on the recovery drum 102 and wrap around the drum 102.

In light of the above, it is therefore understood that within the scope of the appended claims, the invention may be practiced otherwise than as specifically described.

What is claimed is:

1. A towed active acoustic system comprising:
   a tow cable having a plurality of segments; and
   a plurality of soft-bodied, towable, active acoustic modules disposed between said segments of said tow cable such that each soft-bodied acoustic module is disposable at a different depth in a water column, each soft-bodied acoustic module including:
   a swivel mechanism to mechanically terminate each tow cable segment;

a flexible body portion having segmented sections which allow lateral bending of said body portion; and an active acoustic array located within said body portion and extending along a span of said body portion, said swivel mechanism allowing said active acoustic modules to be towed in a substantially vertical position.

2. A system as in claim 1 wherein said acoustic modules each further comprises a means for positioning said body portion in said substantially vertical position.

3. A system as in claim 2 wherein said means for positioning comprises an offset balancing weight disposed in a lower and rearward location in said body portion.

4. A system as in claim 2 wherein said means for positioning comprises a flow control device to provide lateral stability.

5. A system as in claim 1 wherein said tow cable includes a non-rigid, fairing cross-section.

6. A system as in claim 1 wherein said active acoustic array comprises a plurality of acoustic transducers connected together with flexible connectors.

7. A system as in claim 6 wherein each of said soft-bodied acoustic modules includes a different number of acoustic transducers.

8. A system as in claim 1 wherein said body portion comprises a hydrofoil capable of reducing drag to further maintain the body portion in the substantially vertical position.

9. A towed active acoustic system comprising:

a tow cable having a plurality of segments, said tow cable having faired, non-rigid cross section; and a plurality of soft-bodied, towable, active acoustic modules disposed between said segments of said tow cable such that each soft-bodied acoustic module is disposable at a different depth in a water column, each soft-bodied acoustic module including:

a swivel mechanism to mechanically terminate each tow cable segment;

a flexible body portion having segmented sections which allow lateral bending of said body portion; and an active acoustic array located within said body portion and extending along a span of said body portion, said swivel mechanism allowing said active acoustic modules to be towed in a substantially vertical position.

10. A towed active acoustic system as in claim 9 wherein said active acoustic array comprises a plurality of acoustic transducers connected together with flexible connectors.

11. A towed active acoustic system as claimed in claim 10 wherein each of said soft-bodied acoustic modules includes a different number of acoustic transducers.

* * * * *